May 1, 1934.  W. H. DEUBENER  1,957,099
BASKET
Filed May 23, 1931

Inventor
Walter H. Deubener
By Howard Pusher
Attorney

Patented May 1, 1934

1,957,099

UNITED STATES PATENT OFFICE 1,957,099

BASKET

Walter H. Deubener, St. Paul, Minn.

Application May 23, 1931, Serial No. 539,431

9 Claims. (Cl. 229—52)

My invention relates to an improvement in baskets which may be made of paper or other suitable material, and which are designed for use in carrying parcels or bundles. My basket is provided with flexible handle means which form a support for the basket and the contents thereof when the same is carried.

The novel feature of primary importance in my invention resides in the particular formation of locking flaps and tongues, and the manner of securing the sides and ends together to form a basket which will not easily come apart even when considerable strain is exerted tending to open the same.

It is an object of my invention to provide a basket which may be formed in a single cutting operation. The basket of my design may be formed by cutting a blank of paper or other suitable material in a peculiar outline by means of a single die. The lines along which the material forming the basket is folded may also be scored if necessary in the same operation. Thus, in a single operation, my basket may be cut and placed in readiness to be folded into the proper shape and secured together; and the handle member attached.

It is a feature of my invention that the basket made in accordance with the principles of my invention is rectangular in plan outline, and the handle member extends above the top edge thereof in such a manner that the basket may be carried in the hand at the side of the carrier. For this reason, a number of articles may be carried in the basket without undue bulkiness or inconvenience to the carrier.

It is a feature of my invention to make my basket long and narrow, with suitable connecting flaps and locking tongues which hold the basket together securely, and prevent the sides from coming apart. The side and end walls of my basket are formed of trapezoidal shape, flaring outwardly from the base to the top, the perimeter around the top edge being somewhat greater than the perimeter around the base. The handle cord is adapted to encircle the bottom of the basket and is anchored in the sides of the same in a manner to form a support for the basket and the goods contained therein.

It is a feature of my invention that the design of my basket lends itself well to the carrying of articles such as bathing suits to and from the beach. When used for this purpose, the material forming the basket is made waterproof, and drain holes are provided for allowing water issuing from the wet garments to drain from the container.

Other objects and novel features of my invention will be more clearly and fully set forth in the following specification and claims.

In the drawing forming a part of this specification:

Figure 1:
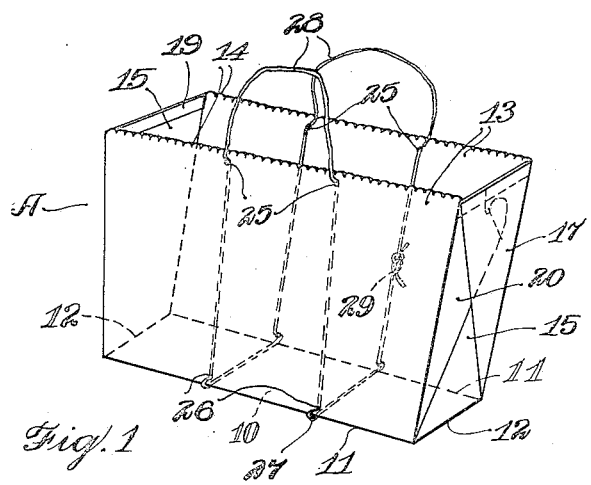
Figure 1 illustrates a perspective view of my basket as it would appear in use.
Figure 2:
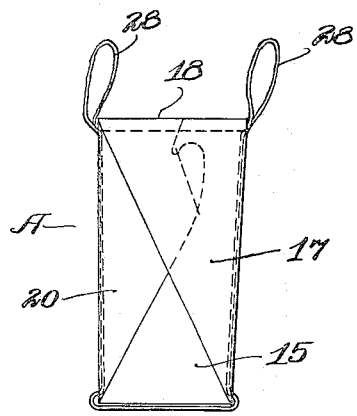
Figure 2 illustrates an end view of my basket, illustrating the locking means for holding the same together, an adhesive being employed for securing the various parts together.

My basket A is primarily designed for use as a shopping basket, and is long and narrow in form so that it may be easily carried at the side. The basket A is provided with a bottom member 10 having long side edges 11 and comparatively short end edges 12, and is rectangular in formation.

Side members 13 are formed along the side edges 11 of the bottom 10. The side members 13 are trapezoidal in formation, the side edges 11 of the bottom member 10 which form the bottom edges of the side members 13 being somewhat shorter than the top edges 14 thereof.

End members 15 are formed along the end edges 12 of the bottom member 10. These end members 15 are also trapezoidal in shape, and flare outwardly from the end edges 12 which form the bottom edges of the end members 15. The top edges 16 of the ends 15 are somewhat longer than the edges 12.

Along diagonally opposite ends of the side members 13 are formed triangularly shaped flaps 17. These flaps 17 are adapted to overlap the end members 15 when the basket A is folded. Along the upper edge 18 of the side flaps 17 are provided flaps or lips 19 which are adapted to fold over the upper edges 16 of the end members 15 in a manner which will be hereinafter more fully described.

Along the other diagonally opposite ends of the side members 13 of the sheet A I provide flaps 20 which are also substantially triangular in form and which are adapted to fold over the end members 15 when the basket A is folded. Locking tongues 22 integrally formed on the flaps 20 are adapted to extend through slits 23 formed in the end members 15 to lock these flaps 20 to the end members 15.

In assembling the basket A from the irregularly cut blank it is first necessary to fold the side members and end members upwardly from the bottom member 10 on the edges 11 and 12. The flaps 20 are then folded in a manner to overlap the end members 15, and the locking tongues 22 are inserted through the slots 23. The flaps 17 are then folded along the ends of the side members 13 to overlap the end members 15, folding also partially over the flaps 20. The flaps or lips 19 are then folded over the top edges 16 of the end members 15, and are glued to the inside surface of these end flaps 15.

The basket A folded and secured in this manner will hold securely under comparatively great strain, and will prevent the ends from unfolding when pressure is exerted against the same. Accordingly, many parcels or packages may be placed in the basket without collapsing the same.

Figure 3:
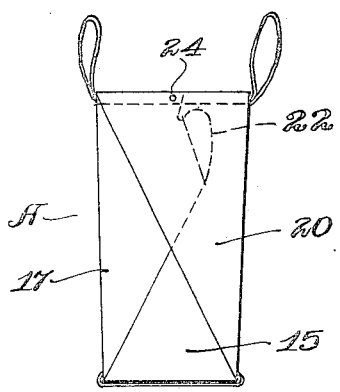
Figure 3 illustrates an end view of my basket, showing the locking means for holding the parts in correct relationship, rivets being used for securing the parts in this relationship.
Figure 4:
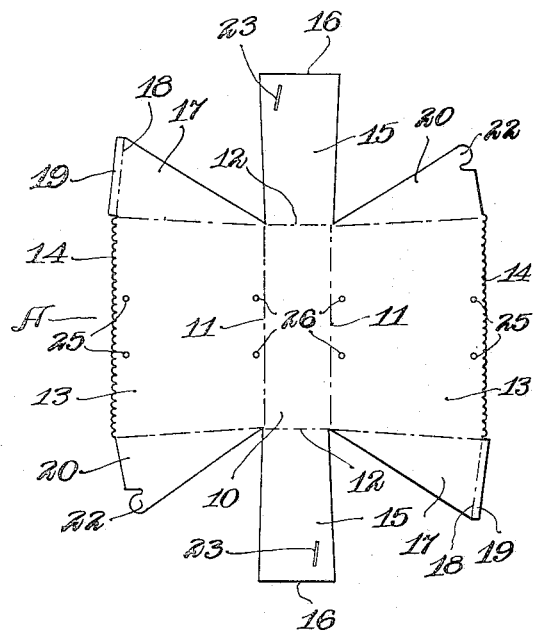
Figure 4 is a diagrammatic view of the died-out formation of my basket after the same has been cut from a flat sheet and before the folding and assembling operation.
Figure 5:
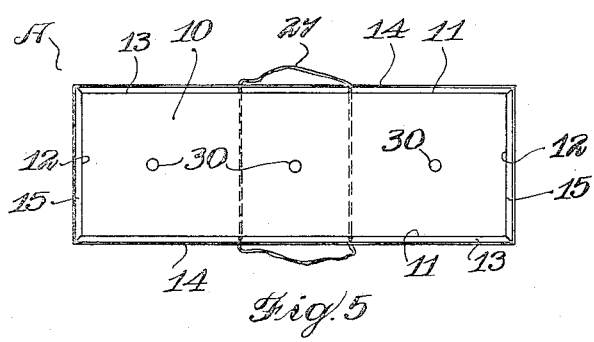
Figure 5 is a plan view of my basket, illustrating the drain holes formed in the bottom member for allowing water from wet articles placed within the basket to drain readily.

If it is desired, instead of glueing the flaps 19 to the inner surface of the flaps 15, rivets 24 may be employed in the manner illustrated in Figure 3 of the drawing. A rivet 24 passing through the center of the end member 15 will pass through the flap 17, the flap 20, the end member 15, and the flap 19 on each end of the basket A, thus firmly holding each of these parts in the proper relationship.

A pair of holes 25 are formed through each side member 13 near the top edge 14 thereof, and a second pair of holes 26 are formed through each of these side members near the bottom edge 11 of the same. A flexible cord forming a handle is threaded through these holes in the manner illustrated in Figure 1 of the drawing, passing along the inner surface of the side members 13 between the holes 25 and 26 of each side member, and circling beneath the bottom member 10. The cord 27 thus forms a support for the bottom 10 of the basket A and for the articles contained therein. The cord 27 forms a handle loop 28 extending upwardly from each of the side members 13, and these loops provide a means of carrying the basket A. The single flexible cord 27 is knotted together at the ends at 29, as illustrated in Figure 1.

When it is desired to use the basket A for carrying wet articles, such as bathing suits and the like, the material forming the basket A is waterproof, or is treated with a waterproofing material to prevent the moisture from softening or otherwise injuring the material. Holes 30 are provided in the bottom member 10, so that moisture from the wet garments may readily drain from the basket.

My basket A may be easily cut, quickly folded, and readily assembled. The flare in the bags is sufficient to permit the bags to nest together readily for packing or shipping. The manner of holding the bag together permits a number of articles to be carried therein without danger of the basket collapsing or getting disconnected.

In accordance with the patent statutes I have described the principles of operation of my basket, and while I have endeavored to set forth the best embodiment thereof, I desire to have it understood that this is only illustrative of a means of carrying out my invention and that obvious changes may be made within the scope of the following claims without departing from the spirit of the invention.

I claim:

1. A basket formed from sheet material die-cut to fold in rectangular formation, rectangular shaped end flaps, slits in said end flaps, overlapping triangular-shaped end flaps adapted to overlap said rectangular end flap, one of said triangular-shaped end flaps having a tongue adapted to be inserted in said slit in said end flap, and the other of said triangular end flaps having a marginally extending locking flap adapted to be adhered over the upper edge of said rectangular end flap and said triangular flap to seal the ends of said basket.

2. A basket formed from sheet material having, rectangular sides, a narrow rectangular bottom, rectangular end flaps, and pairs of triangular-shaped end flaps projecting from the ends of said sides, said triangular flaps being adapted to overlap, and one of the same having a sealing flap adapted to be secured over the upper edge of the other triangular end flap and said rectangular end flap to secure the same together.

3. A moisture-resisting basket formed from a single sheet of material, died-out sides, overlapping triangular end flaps projecting from said sides, a bottom portion, rectangular ends projecting from said bottom portion having a height equal to said sides, said overlapping triangular end flaps including a slit and locking tongue engagement with said ends, and an overlying marginal flap adapted to seal the upper edges of said flaps at the ends of said basket together.

4. A basket formed from sheet material, a rectangular bottom portion, rectangular sides projecting from either side of said bottom portion, rectangular-like ends projecting from the ends of said bottom portion, triangular flaps projecting from said sides, a hook-like tongue on one of said flaps, a slit in said end flaps adapted to receive said tongue, and a marginal sealing flap projecting from the other of said triangular flaps adapted to be sealed over the upper edge of the overlapping portions of the ends of said basket to lock the ends in a manner to hold the sides and ends in a basket-like formation with the bottom.

5. A basket of paper or the like died-out from a single sheet of material including, a bottom member, side walls, end walls, flaps on one end of said side walls, locking tongues on said flaps for securing said flaps to said end walls, flaps on the other ends of said side walls, and means on said last-named flaps folding over the top edges of said end walls, and means for adhering said means to the inner surface of said end walls.

6. A basket including, a bottom member, side and end walls extending therefrom, flaps on the ends of said side walls, locking tongues on the flaps on one end of each of said side walls engageable with said end walls to lock the side and end walls together, and lips on the other of said flaps adapted to be secured to the inner surface of said end walls.

7. A basket formed from a single sheet of material including, a bottom member, flaring side and end walls extending therefrom, flaps on the ends of said side members, locking tongues on said flaps on diagonally opposite ends of said side walls, slits in said end walls for receiving said locking tongues, and marginal sealing extensions on the upper edge of the other of said flaps adapted to fold over the top edges of said end walls and be secured thereto.

8. A basket including, a bottom member, side and end walls extending therefrom, triangular-shaped flaps on diagonally opposite ends of said side walls foldable to overlap said end walls, locking tongues on said flaps for securing the same to said end walls, flaps on the other ends of said side members, foldable over said end walls and partially over said first-named flaps, and marginal sealing extensions on said last-named flaps for securing the same to said end walls.

9. A carrying basket died-out from a flat sheet and scored to be folded into shape, having bottom, side and end members, end flaps formed projecting from said sides to overlie said end members, and a marginal sealing flap on one end flap at each end foldable over the edges of the others of said end flaps and said ends, and secured along the inner surface of the upper edge of said end flaps to hold said basket in set-up folded position.

WALTER H. DEUBENER.